United States Patent
Rozek

(10) Patent No.: US 9,362,822 B2
(45) Date of Patent: Jun. 7, 2016

(54) AVERAGE LOAD CURRENT DETECTOR FOR A MULTI-MODE SWITCHING CONVERTER

(71) Applicant: RF Micro Devices, Inc., Greensboro, NC (US)

(72) Inventor: Ashraf Rozek, Greensboro, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 266 days.

(21) Appl. No.: 14/096,603

(22) Filed: Dec. 4, 2013

(65) Prior Publication Data

US 2014/0152285 A1   Jun. 5, 2014

Related U.S. Application Data

(60) Provisional application No. 61/733,212, filed on Dec. 4, 2012.

(51) Int. Cl.
*H02M 3/156* (2006.01)
*H02M 1/00* (2006.01)

(52) U.S. Cl.
CPC ...... *H02M 3/156* (2013.01); *H02M 2001/0009* (2013.01); *H02M 2001/0032* (2013.01); *Y02B 70/16* (2013.01)

(58) Field of Classification Search
CPC ............. H02M 2001/0009; H02M 2001/0032; H02M 3/155; H02M 3/156; H02M 3/158
See application file for complete search history.

(56) References Cited

U.S. PATENT DOCUMENTS

| | | | | |
|---|---|---|---|---|
| 7,030,596 | B1 * | 4/2006 | Salerno | H02M 3/158 323/282 |
| 8,072,180 | B1 * | 12/2011 | Sachs | G01R 19/2506 318/807 |
| 2009/0153119 | A1 * | 6/2009 | Trochut | H02M 3/1588 323/282 |
| 2011/0241737 | A1 * | 10/2011 | Liou | H02M 1/08 327/109 |
| 2012/0049825 | A1 * | 3/2012 | Chen | H02M 3/156 323/284 |
| 2012/0153915 | A1 * | 6/2012 | Loikkanen | G05F 1/618 323/283 |
| 2012/0217946 | A1 * | 8/2012 | Ju | H02M 3/156 323/285 |
| 2013/0294118 | A1 * | 11/2013 | So | H02M 3/33507 363/21.16 |
| 2015/0137776 | A1 * | 5/2015 | Thomas | H02M 3/1588 323/271 |

* cited by examiner

*Primary Examiner* — Fred E Finch, III
(74) *Attorney, Agent, or Firm* — Withrow & Terranova, P.L.L.C.

(57) ABSTRACT

An average load current detector for a multi-mode switching converter is disclosed. The average load current detector includes a sense voltage generator that generates an average sense voltage that is proportional to an average load current delivered by the multi-mode switching converter. Also included is a duty voltage generator that generates an average duty voltage that is proportional to a duty cycle of a pulse width modulation (PWM) signal that controls switching of the multi-mode switching converter. Further included is a comparator adapted to output a detector signal that indicates an operational mode for the multi-mode switching converter to operate in for predetermined load current ranges. A controller receives the detector signal and in response maintains an efficient energy transfer from one supply voltage level to another by transitioning the multi-mode switching converter from the PWM mode to a pulse frequency modulation (PFM) mode or vice versa if necessary.

21 Claims, 3 Drawing Sheets

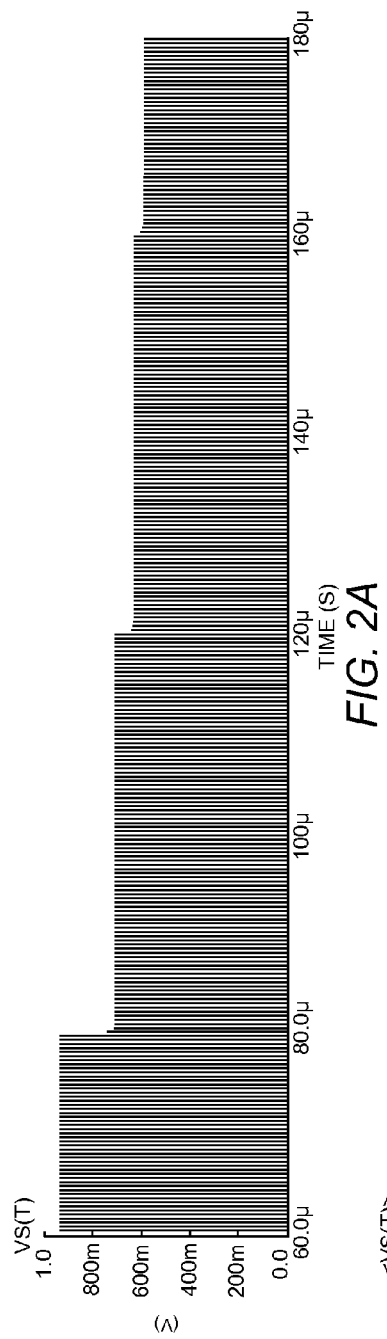
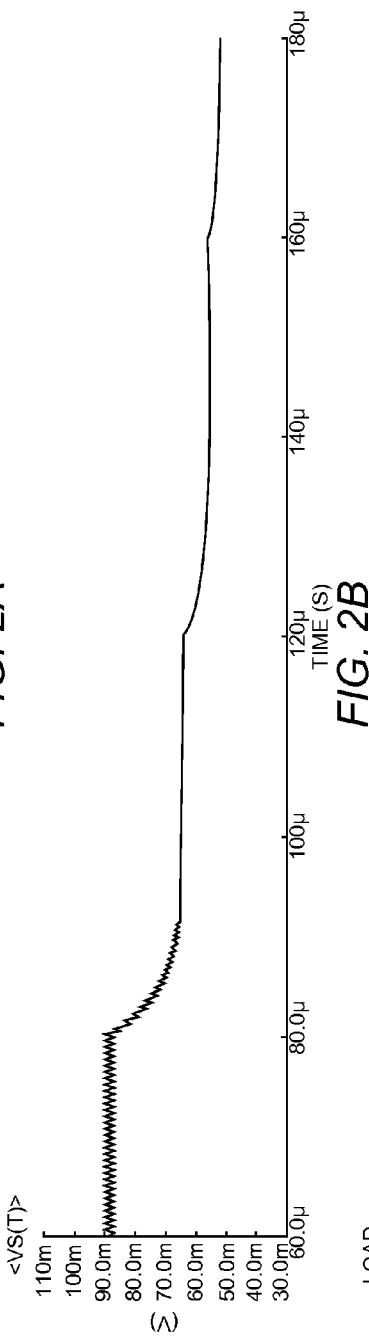
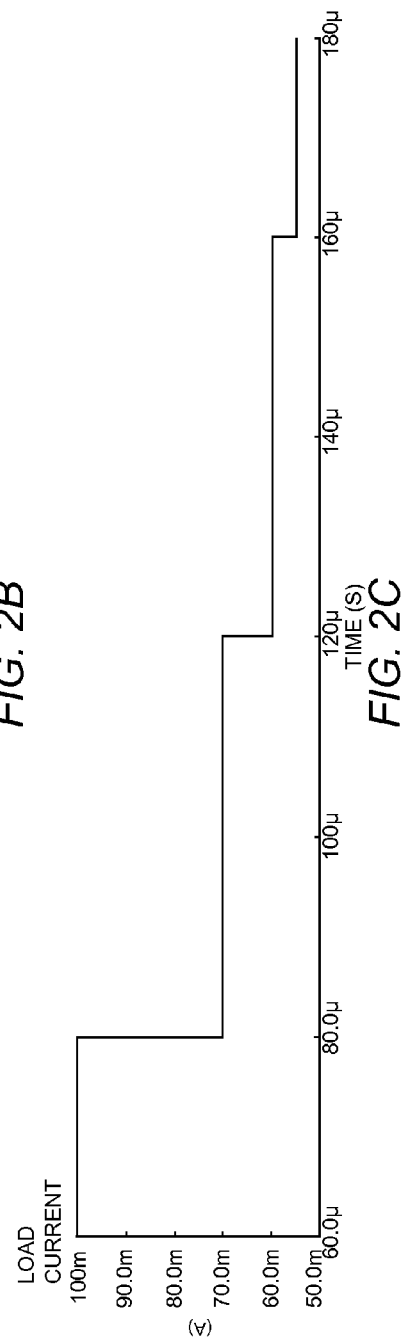
FIG. 2A
FIG. 2B
FIG. 2C

AVERAGE LOAD CURRENT DETECTOR FOR A MULTI-MODE SWITCHING CONVERTER

RELATED APPLICATIONS

This application claims the benefit of U.S. provisional patent application No. 61/733,212, filed Dec. 4, 2012, the disclosure of which is incorporated herein by reference in its entirety.

FIELD OF THE DISCLOSURE

The present disclosure relates to multi-mode switching converters. In particular, the present disclosure relates to detector circuitry that is usable to automatically assist in detecting a load condition that requires switching between modes of operation for multi-mode switching converters in order to maintain efficiency for energy transfer from one supply voltage level to another.

BACKGROUND

Multi-mode switching converters such as direct current-to-direct current (DC-DC) converters have different modes of operation for different load conditions. These different modes of operation are needed to provide a desirable mode of operation for a particular load condition. Typically, a desirable mode of operation is one in which a peak efficiency for energy transfer is achieved for a given load condition. One mode of operation is pulse width modulation (PWM), which is a form of pulse-time modulation wherein durations of pulses are varied while pulse frequency remains relatively constant. A multi-mode switching converter achieves a maximum efficiency for energy transfer from one supply voltage level to another while using PWM for loads having a relatively moderate current draw to a relatively heavy current draw. Another mode of operation is pulse frequency modulation (PFM), which is a form of pulse time modulation wherein a pulse repetition rate is varied, while pulse width remains relatively constant. A multi-mode switching converter achieves a maximum efficiency for energy transfer from one supply voltage level to another while using PFM for loads having a relatively light current draw to a relatively moderate current draw. At some point within a range of relatively moderate load currents a transition between the PWM mode and the PFM mode is necessary to maintain a desired efficiency for energy transfer. What is needed is a detector circuit to assist a controller for a multi-mode switching converter in determining if a transition from the PWM mode to the PFM mode or vice versa is required to maintain efficiency energy transfer from one supply voltage level to another.

SUMMARY

An average load current detector for a multi-mode switching converter is disclosed. The average load current detector includes a sense voltage generator that generates an average sense voltage that is proportional to an average load current delivered by the multi-mode switching converter. Also included is a duty voltage generator that generates an average duty voltage that is proportional to a duty cycle of a pulse width modulation (PWM) signal that controls switching of the multi-mode switching converter. Further included is a comparator adapted to output a detector signal that indicates an operational mode for the multi-mode switching converter to operate in for predetermined load current ranges. A controller receives the detector signal and in response maintains an efficient energy transfer from one supply voltage level to another by transitioning the multi-mode switching converter from the PWM mode to a pulse frequency modulation (PFM) mode or vice versa if necessary.

A benefit provided by the average load current detector is a smooth transition between modes of operation in which a peak efficiency for energy transfer is achieved for a given load condition. An added benefit is that the average load current detector is highly responsive to load current while being largely unaffected by pulse width changes during PWM operation of the multi-mode switching converter.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 2A is a waveform graph showing an instantaneous sense voltage that responds to changes in the instantaneous load current.

FIG. 2B is a waveform graph showing an average sense voltage that is proportional to average load current.

FIG. 2C is a waveform graph showing a series of decreasing load current steps.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims. Also note that throughout the specification that brackets < > placed around a symbol representing a current or voltage indicates the average current or voltage. For example, an average of a voltage V(T) is represented as <V(T)>.

Figure 1:
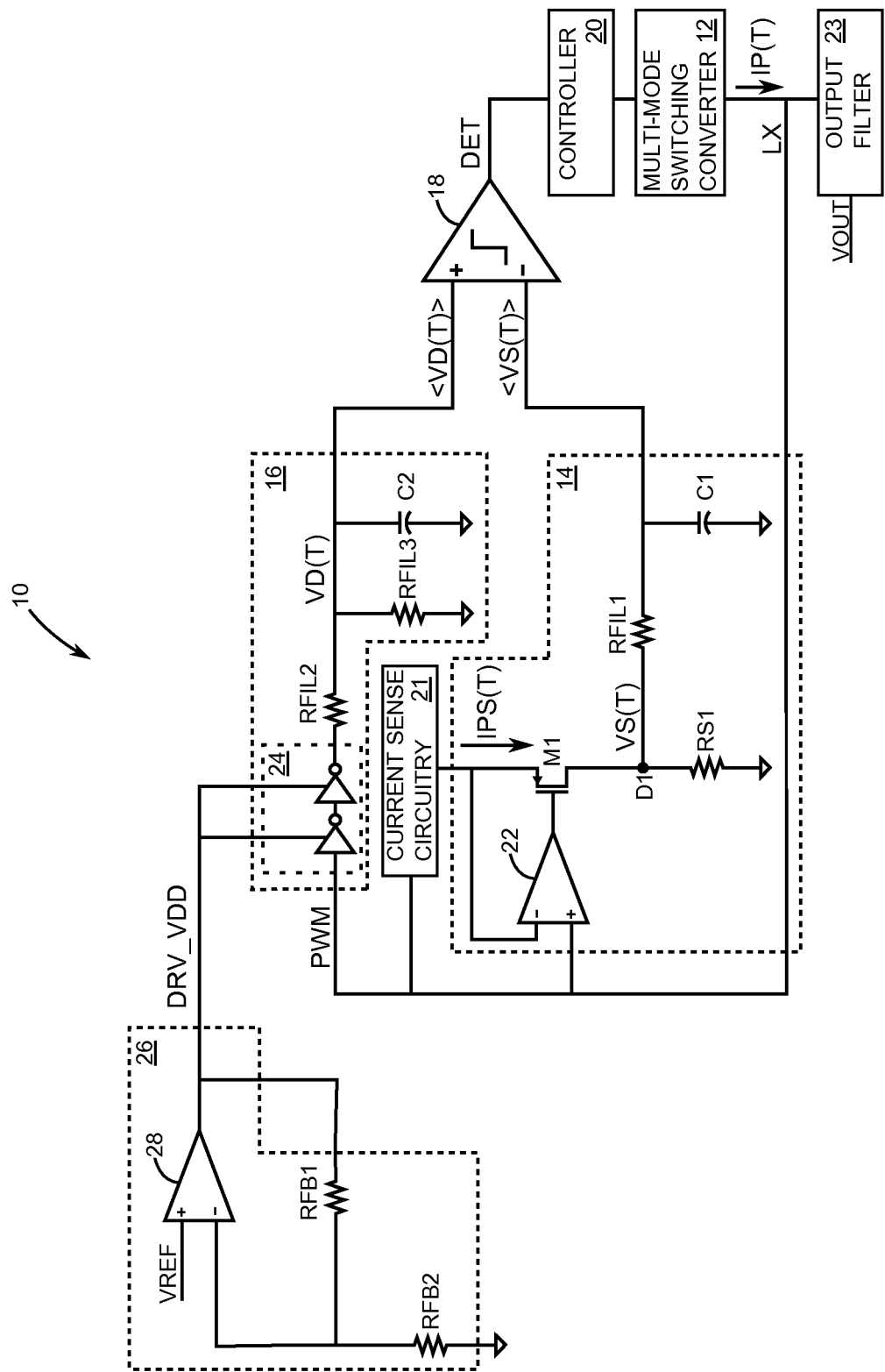
FIG. 1 is a schematic of an average load current detector for a multi-mode switching converter that is in accordance with the present disclosure.

FIG. 1 is a schematic depicting an average load current detector 10 for a multi-mode switching converter 12. The average load current detector 10 includes a sense voltage generator 14 that generates an average sense voltage <VS(T)> that is proportional to an average load current <IP(T)> delivered by the multi-mode switching converter 12. Also included is a duty voltage generator 16 that generates an average duty voltage <VD(T)> that is proportional to a duty cycle of a pulse width modulation (PWM) signal that controls switching of the multi-mode switching converter 12. Further included is a comparator 18 adapted to output a detector signal DET that indicates an operational mode in which the multi-mode switching converter 12 should operate in for predetermined load current ranges. A controller 20 receives the detector signal DET and in response maintains an efficient energy transfer from one supply voltage level to another by transitioning the multi-mode switching converter 12 from the PWM mode to a pulse frequency modulation (PFM) mode or vice versa if necessary.

Current sense circuitry 21 generates a sense load current IPS(T) that is a scaled copy of the instantaneous load current IP(T). The sense voltage generator 14 is made up of a buffer amplifier 22 having an output coupled to a positive field effect transistor (PFET) M1 that receives the sense load current IPS(T), which in turn flows through a sense resistor RS1 to generate an instantaneous sense voltage VS(T). The sense load current IPS(T) is generated by the current sense circuitry 21. In the exemplary embodiment of FIG. 1, the sense load current IPS(T) is scaled by a scale factor N that ranges from around about 100 to around about 1000. In another embodiment, the sense load current IPS(T) is scaled by a scale factor N that ranges from around about 1000 to around about 5000. Thus, the sense load current IPS(T) is equal to IP(T)/N. In the exemplary embodiment of FIG. 1, the buffer amplifier 22 has unity gain.

A non-inverting input of the buffer amplifier 22 is coupled to a switching output terminal of the multi-mode switching converter 12 known as the LX node. The instantaneous sense voltage VS(T) is filtered by a resistor-capacitor (RC) filter made up of a filter resistor RFIL1 coupled between a sense current output terminal D1 of the PFET M1 and a negative input of the comparator 18. A filter capacitor C1 is coupled between the negative terminal of the comparator 18 and a common voltage node. In the exemplary embodiment of FIG. 1, the common voltage node is ground. It should be noted that an output filter 23 of the inductor-capacitor (LC) filter type is coupled to the LX node. As such, an instantaneous voltage at the LX node retains the PWM waveform, while an output voltage VOUT is filtered.

The duty voltage generator 16 is made up of a buffer 24 that is supplied by a voltage regulator 26 that maintains a stable driver voltage DRV_VDD. The voltage regulator 26 in the exemplary embodiment shown in FIG. 1 comprises an amplifier 28 having a non-inverting input terminal coupled to a reference voltage VREF and an inverting input terminal coupled to an output of the amplifier 28 through a feedback resistor RFB1. A second feedback resistor RFB2 is coupled between the inverting input of the amplifier 28 and the common voltage node. Resistance values for the feedback resistors RFB1 and RFB2 determine the gain of the amplifier 28.

The buffer 24 shown in the exemplary embodiment of FIG. 1 is made up of two logic inverters coupled in series. However, it is to be understood that other buffer configurations are usable as long as a PWM signal driving the duty voltage generator 16 is not substantially loaded by a second RC filter made up of a second filter resistor RFIL2, a third filter resistor RFIL3, and a second filter capacitor C2. The second filter resistor RFIL2 is coupled between an output of the buffer 24 and a positive input of the comparator 18. The second filter capacitor C2 is coupled between the positive terminal of the comparator 18 and the common voltage node, which in the exemplary embodiment is ground. The third filter resistor RFIL3 is coupled in parallel with the second filter capacitor C2.

In operation, the average load current detector 10 detects an average load current <IP(T)> flowing through the LX node of the multi-mode switching converter 12. The average load current <IP(T)>=D×IP(T), where IP(T) is the instantaneous current flowing through the LX node of the multi-mode switching converter 12 and D is the duty cycle of the PWM signal controlling the switching of the multi-mode switching converter 12. The sense load current IPS(T) flows through the sense resistor RS1 to generate an instantaneous voltage VS(T) that is averaged via the RC filter of the sense voltage generator 14 to generate an average voltage <VS(T)>. The average voltage <VS(T)>=D×IPS(T)×RS1. The average load current detector 10 then generates a duty voltage, VD(T) that is proportional to the duty cycle, D, by applying the PWM signal to the buffer 24 having the fixed supply voltage DRV_VDD. The duty voltage VD(T) is then averaged via the second RC filter of the duty voltage generator 16 to generate an average duty voltage <VD(T)>. The average load current detector 10 then detects the average load current by comparing the average sense voltage <VS(T)> and the average duty voltage <VD(T)> to output the detector signal DET. Note that the duty voltage VD(T) can be scaled by the second filter resistor RFIL2 and the third filter resistor RFIL3 such that VD(T)=D×DRV_VDD(RFIL3/(RFIL2+RFIL3)).

In the exemplary embodiment of FIG. 1 the detector signal is at a low voltage level when the average sense voltage <VS(T)> is greater than the average duty voltage <VD(T)>. In contrast, the detector signal DET is at a relatively higher voltage level when the average duty voltage <VD(T)> is greater than the average sense voltage <VS(T)>. The relatively low voltage can represent logic 0, whereas the relatively higher voltage can represent logic 1. It is to be understood that the average duty voltage <VD(T)> and the average sense voltage <VS(T)> can be swapped on the positive and negative terminals of the comparator 18 to produce the opposite logic values. In such a case, the logic can be inverted by an inverter to yield the same detector signal DET result as the exemplary embodiment of FIG. 1. It is also to be understood that the resistance value of the sense resistor RS1 and/or the driver voltage DRV_VDD can be adjusted such that the average sense voltage <VS(T)>=<VD(T)> for a given average load current <IP(T)>. In either case, the controller 20 receives the detector signal DET and in response maintains an efficient energy transfer from one supply voltage level to another by transitioning the multi-mode switching converter 12 from the PWM mode to a pulse frequency modulation (PFM) mode or vice versa if necessary.

FIG. 2A is a waveform graph showing an instantaneous sense voltage VS(T) that responds to changes in the instantaneous load current IP(T). In the exemplary case of FIG. 1, the sense load current IPS(T) flows through the PFET M1 and the sense resistor RS1 to produce the instantaneous sense voltage VS(T). As a result, changes in the instantaneous load current IP(T) are indicated by changes in the instantaneous sense voltage VS(T). FIG. 2B is a waveform graph showing that the average sense voltage <VS(T)> is proportional to the average load current <IP(T)> that is shown in FIG. 2C.

Figure 3A:
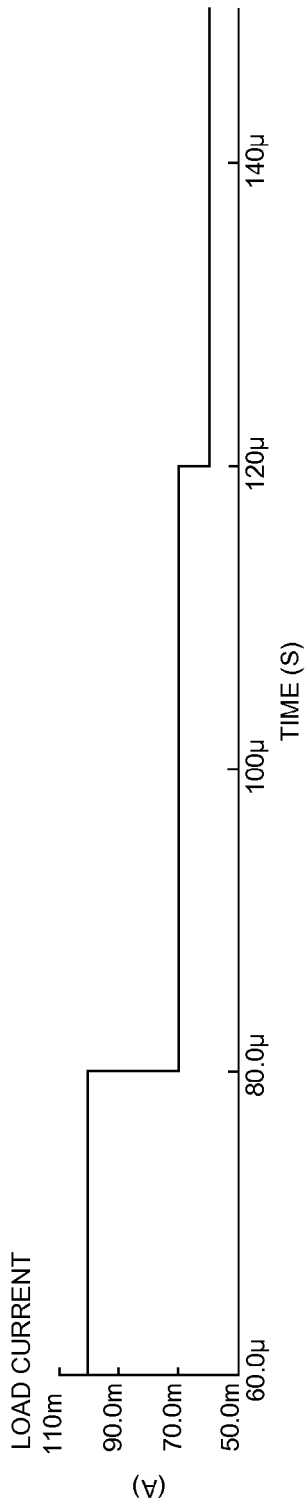
FIG. 3A is a waveform graph showing average load current being stepped down from 100 mA to 60 mA.
Figure 3B:
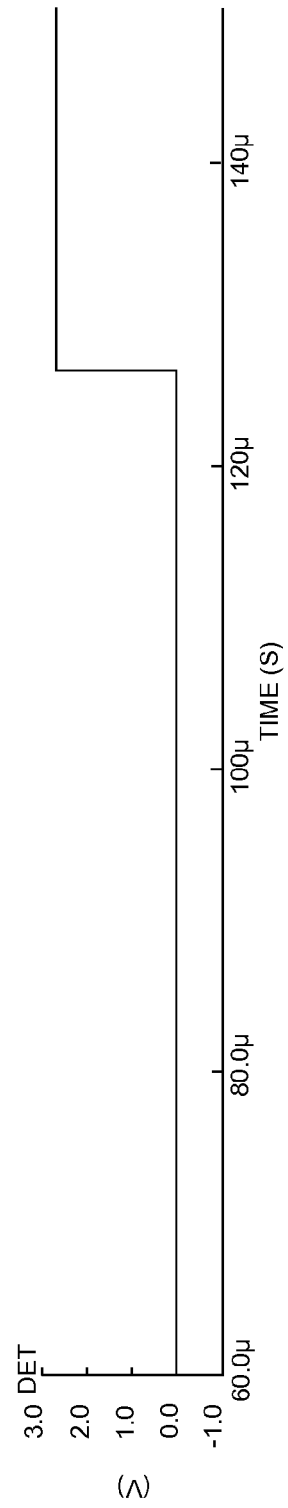
FIG. 3B is a waveform graph showing a detector signal indicating a pulse width modulation (PWM) to pulse frequency modulation (PFM) mode transition is needed to maintain an efficient energy transfer between one supply voltage and another for a relatively light load current.
Figure 3C:
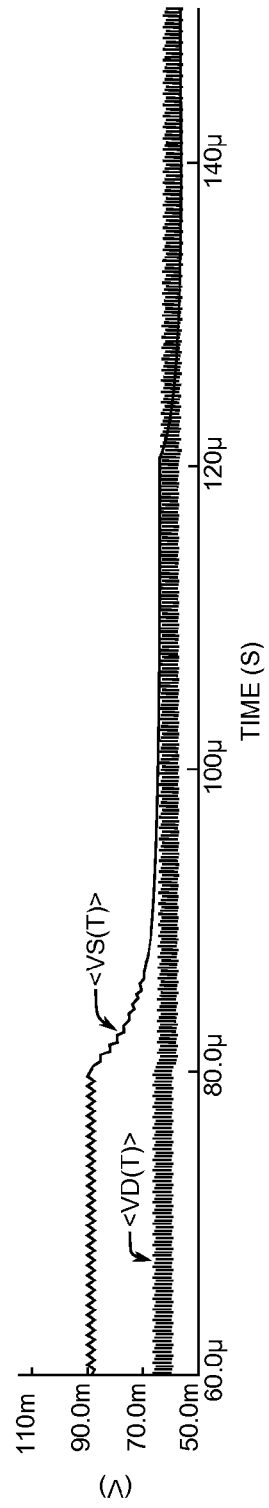
FIG. 3C is a waveform graph showing the average sense voltage responding to load current changes.

FIG. 3A is a waveform graph showing an average load current <IP(T)> being stepped down from 100 mA to 60 mA. In an exemplary case shown in FIGS. 3B and 3C, a predetermined transition point of 60 mA was set for transitioning from a PWM mode to a PFM mode. As such, a waveform graph depicted in FIG. 3B shows a detector signal changing logic states indicating a pulse width PWM to PFM mode transition is needed to maintain and efficient energy transfer between one supply voltage and another for a relatively light load current. Notice that in FIG. 3C, the average sense voltage <VS(T)> responds to the load current changes shown in FIG. 2A while an average duty voltage <VD(T)> has not changed since there is no change in the duty cycle.

Those skilled in the art will recognize improvements and modifications to the embodiments of the present disclosure. All such improvements and modifications are considered within the scope of the concepts disclosed herein and the claims that follow.

What is claimed is:

1. An average load current detector for a multi-mode switching converter comprising:
    a sense voltage generator that generates an average sense voltage that is proportional to an average load current delivered by the multi-mode switching converter;
    a duty voltage generator that generates an average duty voltage that is proportional to a duty cycle of a pulse width modulation (PWM) signal that controls switching of the multi-mode switching converter; and
    a comparator adapted to compare the average sense voltage to the average duty voltage, and in response, output a detector signal that indicates an operational mode for the multi-mode switching converter to operate in for predetermined load current ranges.

2. The average load current detector for the multi-mode switching converter of claim 1 further comprising a controller adapted to receive the detector signal and transition the multi-mode switching converter from one operation mode to another operation mode based upon a logic state of the detector signal.

3. The average load current detector for the multi-mode switching converter of claim 2 wherein the controller is adapted to switch the multi-mode switching converter from operating in a PWM mode to operating in a pulse frequency modulation (PFM) mode when the detector signal indicates an average load current that is less than a predetermined transition load current set point.

4. The average load current detector for the multi-mode switching converter of claim 2 wherein the controller is adapted to switch the multi-mode switching converter from operating in a PFM mode to operating in ta PWM mode when the detector signal indicates an average load current that is greater than a predetermined transition load current set point.

5. The average load current detector for the multi-mode switching converter of claim 1 wherein the sense voltage generator comprises:
    an amplifier having a non-inverting terminal coupled to a switching output terminal of the multi-mode switching converter;
    a transistor having a control input coupled to an output of the amplifier; and
    a sense resistor coupled between an output of the transistor and a common voltage node.

6. The average load current detector for the multi-mode switching converter of claim 5 wherein the common voltage node is ground.

7. The average load current detector for the multi-mode switching converter of claim 6 further including a resistor-capacitor (RC) filter.

8. The average load current detector for the multi-mode switching converter of claim 7 wherein the RC filter comprises a resistor coupled between the output of the transistor and a negative input of the comparator along with a capacitor coupled between the negative input of the comparator to the common voltage node.

9. The average load current detector for the multi-mode switching converter of claim 1 wherein the duty voltage generator comprises a buffer amplifier having a PWM input, at least one regulated voltage supply input, and an output communicatively coupled to a positive input of the comparator.

10. The average load current detector for the multi-mode switching converter of claim 9 further including a second RC filter.

11. The average load current detector for the multi-mode switching converter of claim 10 wherein the second RC filter comprises a second resistor and a second capacitor coupled in parallel between the positive input of the comparator and a common voltage node.

12. The average load current detector for the multi-mode switching converter of claim 11 wherein the common voltage node is ground.

13. The average load current detector for the multi-mode switching converter of claim 11 wherein the second RC filter comprises a third resistor coupled between the output of the buffer amplifier and the positive input of the comparator.

14. The average load current detector for the multi-mode switching converter of claim 9 further comprising a voltage regulator for regulating a supply voltage at the at least one regulated voltage supply input of the buffer amplifier.

15. The average load current detector for the multi-mode switching converter of claim 1 further comprising current sensing circuitry adapted to mirror the average load current to generate a sense load current that is a scaled copy of an instantaneous load current flowing through an output node of the multi-mode switching converter.

16. The average load current detector for the multi-mode switching converter of claim 15 wherein the sense load current is equal to the instantaneous load current divided by a scale factor N that ranges from around about 100 to around about 1000.

17. The average load current detector for the multi-mode switching converter of claim 15 wherein the sense load current is equal to the instantaneous load current divided by a scale factor N that ranges from around about 1000 to around about 5000.

18. A method for average load current detection for a multi-mode switching converter comprising:
    generating an average sense voltage that is proportional to an average load current delivered by the multi-mode switching converter;
    generating a duty voltage that is proportional to a duty cycle of a PWM signal that controls switching of the multi-mode switching converter; and
    comparing the average sense voltage to the average duty voltage; and
    generating a detector signal that indicates an operational mode for the multi-mode switching converter to operate in for predetermined load current ranges based upon a result of the comparing of the average sense voltage to the average duty voltage.

19. The method for average load current detection for the multi-mode switching converter of claim 18 further comprising receiving via a controller the detector signal and transitioning the multi-mode switching converter via the controller from one operation mode to another operation mode based upon a logic state of the detector signal.

20. The method for average load current detection for the multi-mode switching converter of claim 19 wherein switching the multi-mode switching converter via the controller from the one operation mode to the another operation mode based upon the logic state of the detector signal that includes transitioning from operating in a PWM mode to operating in a PFM mode when the logic state of the detector signal indicates an average load current that is less than a predetermined transition load current set point.

21. The method for average load current detection for the multi-mode switching converter of claim 19 wherein switching the multi-mode switching converter via the controller from the one operation mode to the another operation mode based upon the logic state of the detector signal that includes transitioning from operating in a PFM mode to operating in a PWM mode when the logic state of the detector signal indicates an average load current that is greater than a predetermined transition load current set point.

* * * * *